United States Patent [19]
Lee

[11] Patent Number: 5,676,523
[45] Date of Patent: Oct. 14, 1997

[54] BRUSHLESS DC FAN

[76] Inventor: Richard Lee, 10F, No. 525, Chung-Cheng Rd., Hsin-Tien, Taipei Hsien, Taiwan

[21] Appl. No.: 707,584

[22] Filed: Sep. 5, 1996

[51] Int. Cl.$^6$ .................................................. F04D 17/08
[52] U.S. Cl. .................................. 415/206; 415/208.1
[58] Field of Search ........................... 415/206, 208.1, 415/914

[56] References Cited

U.S. PATENT DOCUMENTS

| | | | |
|---|---|---|---|
| 5,174,408 | 12/1992 | Shero | 415/206 |
| 5,288,203 | 2/1994 | Thomas | 415/214.1 |
| 5,399,068 | 3/1995 | Park | 415/206 |
| 5,403,152 | 4/1995 | Trautloff et al. | 415/206 |
| 5,551,836 | 9/1996 | Roth et al. | 415/206 |

*Primary Examiner*—John T. Kwon
*Attorney, Agent, or Firm*—Browdy and Neimark

[57] ABSTRACT

A brushless DC fan including a casing covered with a cover to hold a winding assembly, a fan blade, and a circuit board on the inside, wherein the cover has a raised coupling top raised from a top side thereof, and a plurality of air inlets spaced around the raised coupling top through which air is drawn into the casing; the casing has a top open chamber covered by the cover, a plurality of radiating fins in the top open chamber, and an air outlet in communication with the top open chamber at one side through which air is forced out of the casing; the winding assembly and the circuit board are suspended from the raised coupling top of the cover inside the top open chamber of the casing; the fan blade is pivoted to the winding assembly and suspending in the top open chamber of the casing; the circuit board has rigid electric lead wires extending out of the casing and the cover through wire holes in a downward flange of the cover for connection to power supply.

3 Claims, 5 Drawing Sheets

BRUSHLESS DC FAN

BACKGROUND OF THE INVENTION

1. Technical Field of the Invention

The present invention relates to DC fans, and relates more particularly to a brushless DC fan which needs less installation space. In the brushless DC fan, the winding assembly, the fan blade, and the circuit board are suspended from a raised coupling top of the cover and spaced above the bottom side of the casing, therefore little heat is directly transmitted from the casing to the fan blade, the winding assembly, and the circuit board.

2. Prior Art

FIG. 1 shows the structure of a brushless DC fan according to the prior art. This structure of brushless DC fan is comprised of a fan blade 10a a winding assembly 20a, a circuit board 30a, a casing 40a, and a cover 50a. The winding assembly 20a and the circuit board 30a are mounted in the casing 40a, which is made from heat conductive metal for example aluminum. The fan blade 10a has a center shaft coupled to the center hole of the winding assembly 20a, and is controlled by the circuit board 30a. The bottom side of the casing 40a adjoining to for example a CPU 60a. When the CPU 60a is operated, heat is transmitted from the CPU 60a through the casing 40a to the cover 50a, and at the same time the fan blade 10a is turned to draw outside air into the inside of the casing 40a through an air inlet 51a at the center of the cover 50a. Induced air is further forced out of the casing 40a through an air outlet (not shown) at one side of the casing 40a. In order to let outside air to be drawn into the inside of the casing 40a through the air inlet 51a of the cover 50a, the cover 50a must be spaced from the shell 70a of for example a notebook computer by a space a1. Therefore, the installation space must be at least the height a2 of the DC fan plus the height of the space a1. Because the fan blade 10a, the winding assembly 20a, and the circuit board 30a are mounted in the casing 40a, and the casing 40a is directly attached to the CPU 60a, heat tends to be transmitted to the fan blade 10a, the winding assembly 20a, and the circuit board 30a, causing their service life to be shortened. Because the fan blade 10a is mounted inside the casing 40a at the bottom and spaced from the cover 50a at a certain space, the effective volume of air cannot be increased. When the lead wires of the circuit board 30a are extended out of the DC fan, they tend to displace because there is no locating means to hold the lead wires of the circuit board 30a in place. Further, because the top side of the casing 40a is a flat surface, it cannot be effectively dissipate heat into the air.

SUMMARY OF THE INVENTION

The present invention has been accomplished to provide a brushless DC fan which eliminates the aforesaid drawbacks. According to one aspect of the present invention, the brushless DC fan comprises a casing, a cover covered on the casing, a winding assembly disposed inside the casing, a circuit board disposed inside the casing and having electric lead wires extending out of the casing and connected to power supply, and a fan blade mounted on the winding assembly and controlled by the circuit board to turn around the winding assembly, wherein the cover has a raised coupling top raised from the top side, and a plurality of air inlets spaced around the raised coupling top through which air is drawn into the casing. The casing comprises a top open chamber covered by the cover, and an air outlet in communication with the top open chamber at one side through which air is forced out of the casing. The winding assembly and the circuit board are suspended from the raised coupling top of the cover inside the top open chamber of the casing. The fan blade is pivoted to the winding assembly and suspended in the top open chamber of the casing. Because the raised coupling top is raised from the top side of the cover, a space will be left for ventilation when the raised coupling top of the cover is closely attached to the shell of the instrument for example a notebook computer. Therefore, the brushless DC fan requires less installation space. Because the fan blade, the winding assembly, and the circuit board are suspended from the cover and spaced above the bottom side of the casing, little heat will be directly transmitted from the casing to the winding assembly, the circuit board, and the fan blade. Therefore, the service life of the brushless DC fan is long. According to another aspect of the present invention, the casing has a plurality of recessed holes and radiating fins inside the top open chamber, therefore the air contact surface of the casing is greatly increased, and heat can be quickly dissipated from the casing into the air. According to still another aspect of the present invention, the lead wires of the circuit board are respectively made from rigid electric conductors for positive positioning.

DETAILED DESCRIPTION OF THE PREFERRED EMBODIMENTS

Figure 1:
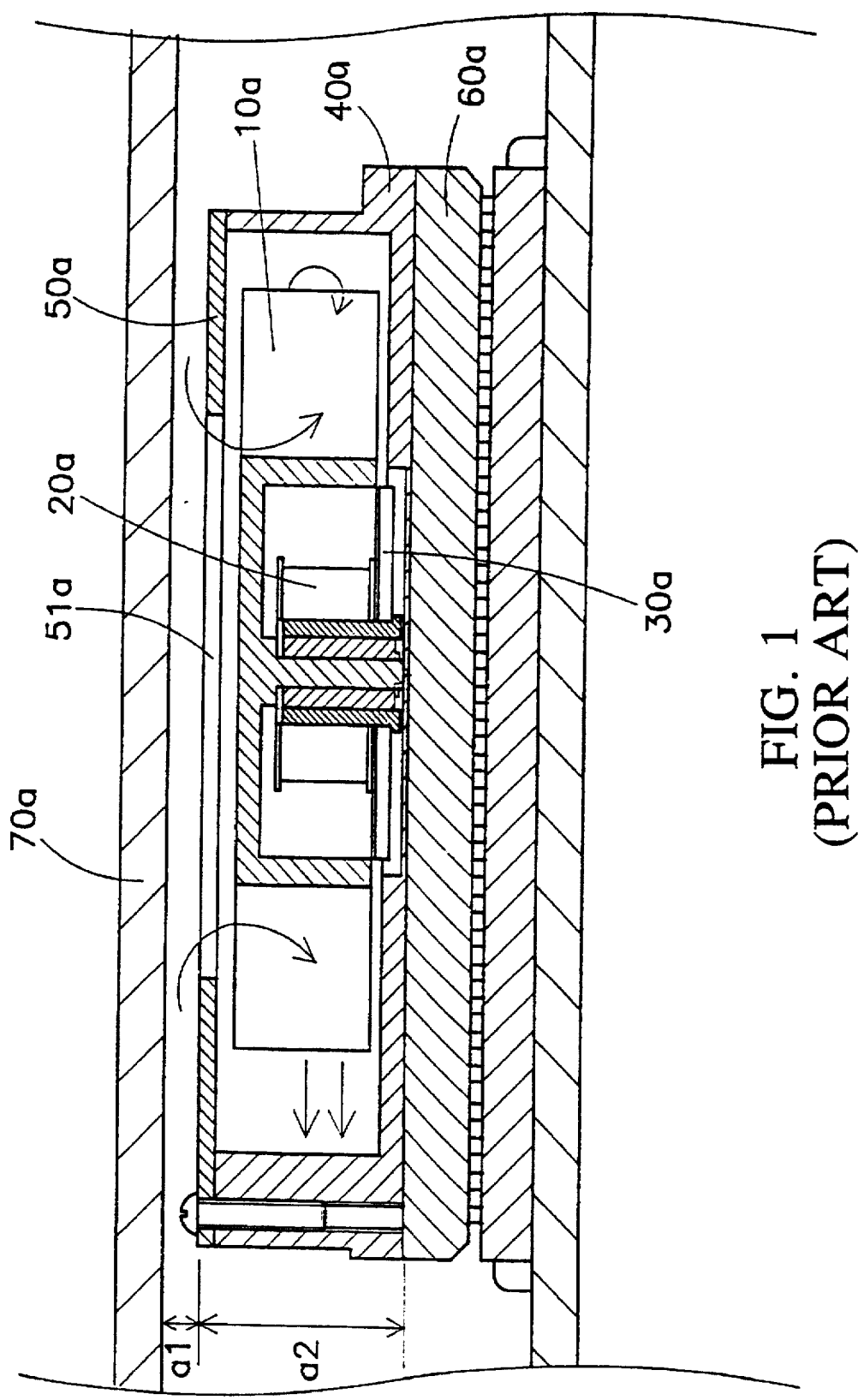
FIG. 1 is a plain view in section of a brushless DC fan according to the prior art.
Figure 2:
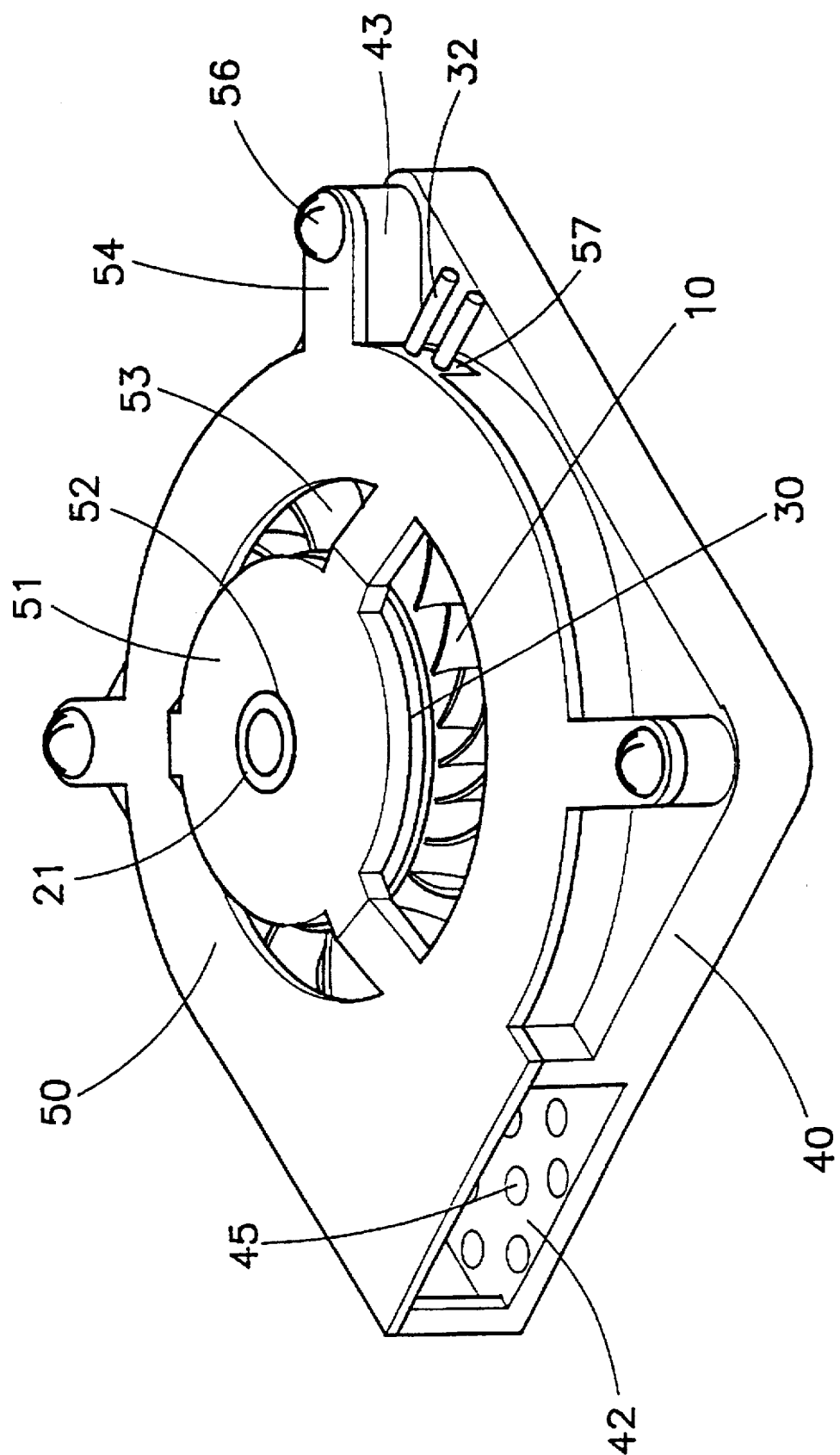
FIG. 2 is an elevational view of a brushless DC fan according to the present invention.
Figure 3:
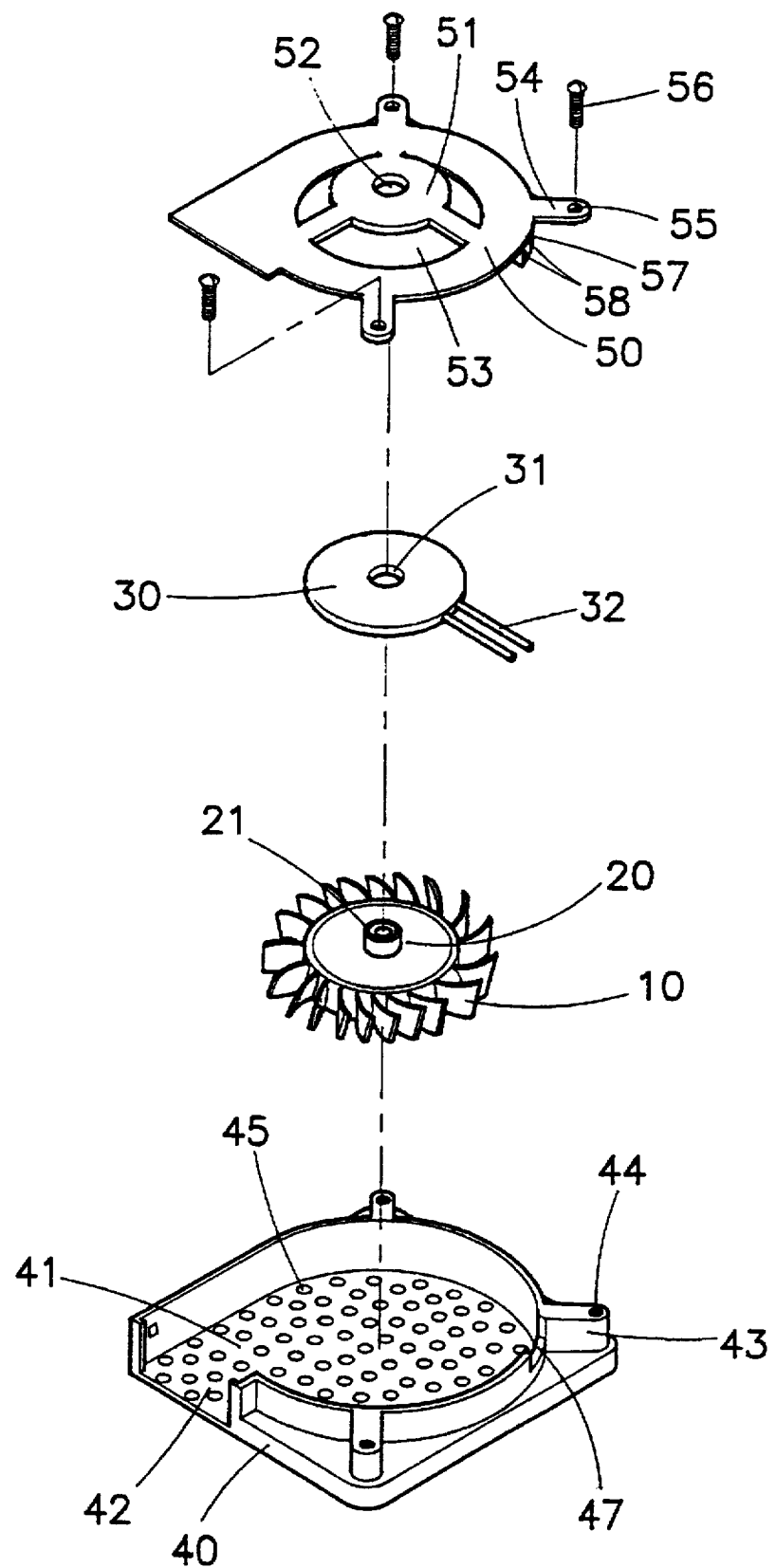
FIG. 3 is an exploded view of the brushless DC fan shown in FIG. 2.
Figure 4:
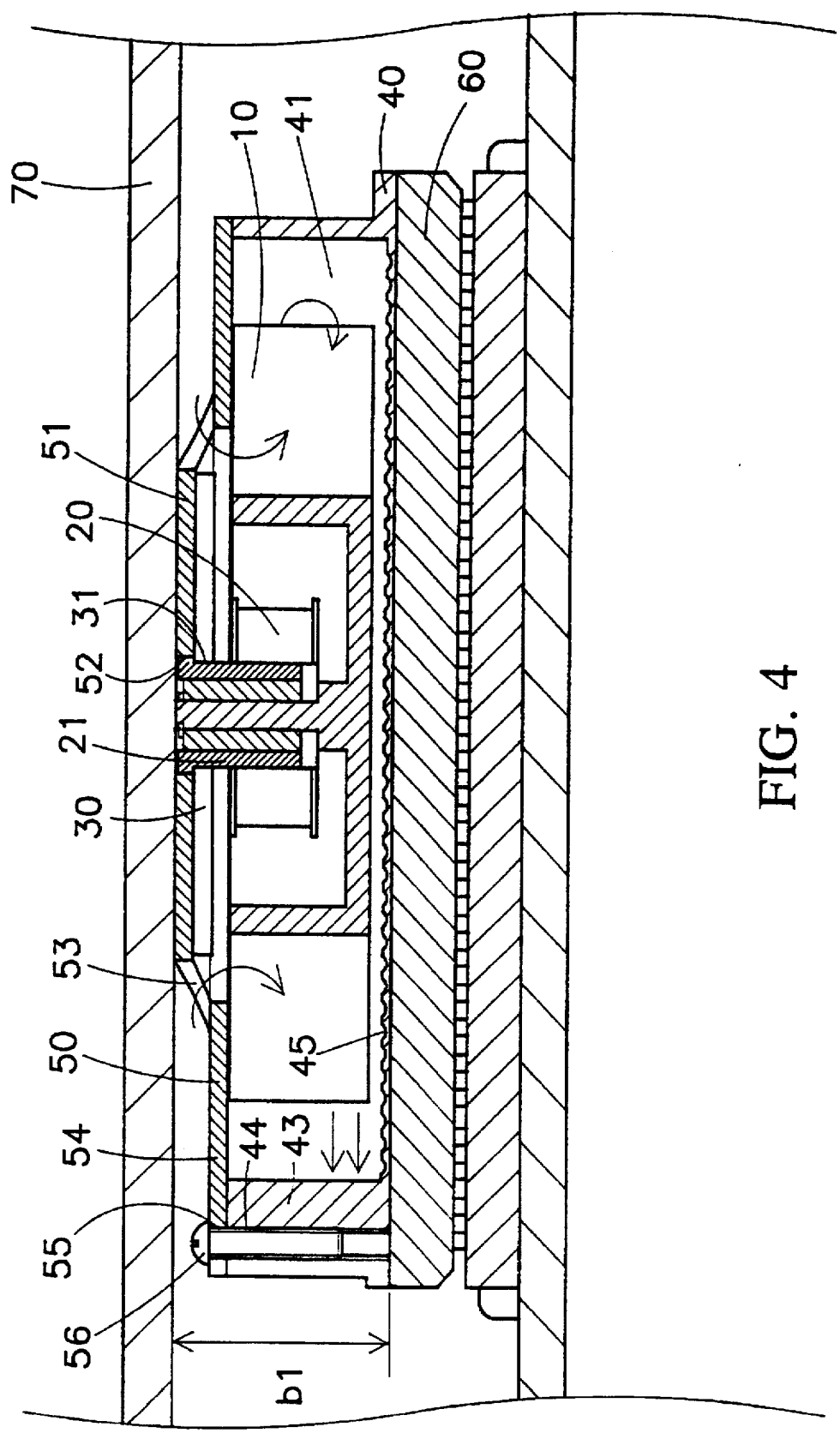
FIG. 4 is a plain view in section of the brushless DC shown in FIG. 2.

Referring to FIGS. 2, 3, and 4, a brushless DC fan in accordance with the present invention is generally comprised of a fan blade 10, a winding assembly 20, a circuit board 30, a casing 40, and a cover 50. The cover 50 comprises a raised coupling top 51, a center coupling hole 52 at the center of the raised coupling top 51, a plurality of air vents 53 spaced around the raised coupling top 51, a plurality of radial lugs 54 spaced around the border and having a respective mounting hole 55, a downward flange 57 having two wire holes 58. The fan blade 10 is mounted on the winding assembly 20, and controlled by the circuit board 30 to rotate the winding assembly 20. The winding assembly 20 has a coupling rod 21 raised from the center. The circuit board 30 has a center through hole 31. The coupling rod 21 of the winding assembly 20 is inserted through the center through hole 31 of the circuit board 30, and coupled to the center coupling hole 52 of the raised coupling to 51 of the cover 50. When the coupling rod 21 of the winding assembly 20 is fastened to the center coupling hole 52 of the cover 50, the fan blade 10, the winding assembly 20, the circuit board 30, and the cover 50 are connected together. The casing 40 is made of heat conductive metal for example aluminum, comprising a top open chamber 41, an air outlet 42 in communication with the top open chamber 41 at one side, a plurality of recessed holes 45 at the bottom side of the open chamber 41, a top notch 47 at the periphery of the top open chamber 41 corresponding to the downward flange 57 of the cover 50, and a plurality of radial ribs 43 spaced around the top open chamber 41 corresponding to the radial lugs 54 of the cover 50. The radial ribs 43 have a respective mounting hole 44. When the cover 50 is covered on the top open chamber 41 of the casing 40, the circuit board 30 and the winding assembly 20 with the fan blade 10 are received in the top open chamber 41, the downward flange 57 of the cover 50 is forced into engagement with the top notch 47 of the casing 40, and the mounting holes 55 of the radial lugs 54 are respectively fastened to the mounting holes 44 of the radial ribs 43 of the casing 40 by a respective fastening element for example a screw 56. When installed, the positive and negative lead wires 32 of the circuit board 30 are extending to the outside of the top open chamber 41 of the casing 40 through the wire holes 58 of the downward flange 57 of the cover 50.

Referring to FIG. 4 again, when the brushless DC fan is installed in for example a notebook computer, the bottom side of the casing 40 is fastened to the CPU 60 to absorb heat from the CPU 60. When operated, the fan blade 10 is controlled by the circuit board 30 to turn around the winding assembly 20, causing currents of air to be drawn into the top open chamber 41 of the casing 40 through the air vents 53 of the cover 50 and then driven out of the casing 40 through the air outlet 42, and therefore heat is quickly carried away from the CPU 60.

As indicated, the coupling top 51 is raised from the top side of the cover 50. When the raised coupling top 51 of the cover 50 is closely attached to the bottom side of the shell 70 of the notebook computer, there is a space left between the top side of the cover 50 and the bottom side of the shell 70 of the notebook computer for ventilation. Therefore, an installation space of height equal to the height b1 of the brushless DC fan is sufficient for the installation of the brushless DC fan. Because the brushless DC fan requires less installation space, the vertical size of the notebook computer can be greatly reduced. Because the fan blade 10, the winding assembly 20, and the circuit board 30 are suspended from the raised coupling top 51 of the cover 50 and spaced from the bottom side of the casing 40, less heat will be directly transmitted from the casing 40 to the fan blade 10, the winding assembly 20, and the circuit board 30, and therefore the service life of the brushless DC fan is relatively prolonged. Because the top open chamber 41 of the casing 40 has a plurality of recessed holes 45, the surface area of the casing 40 is relatively increased for quick dissipation of heat. Furthermore, the lead wires 32 of the circuit board 30 are made from rigid electric conductors. When the lead wires 32 are extended out of the casing 40 and the cover 50 through the wire holes 589 they are stably positioned at the border area outside of the brushless DC fan for connection to the power supply circuit.

Figure 5:
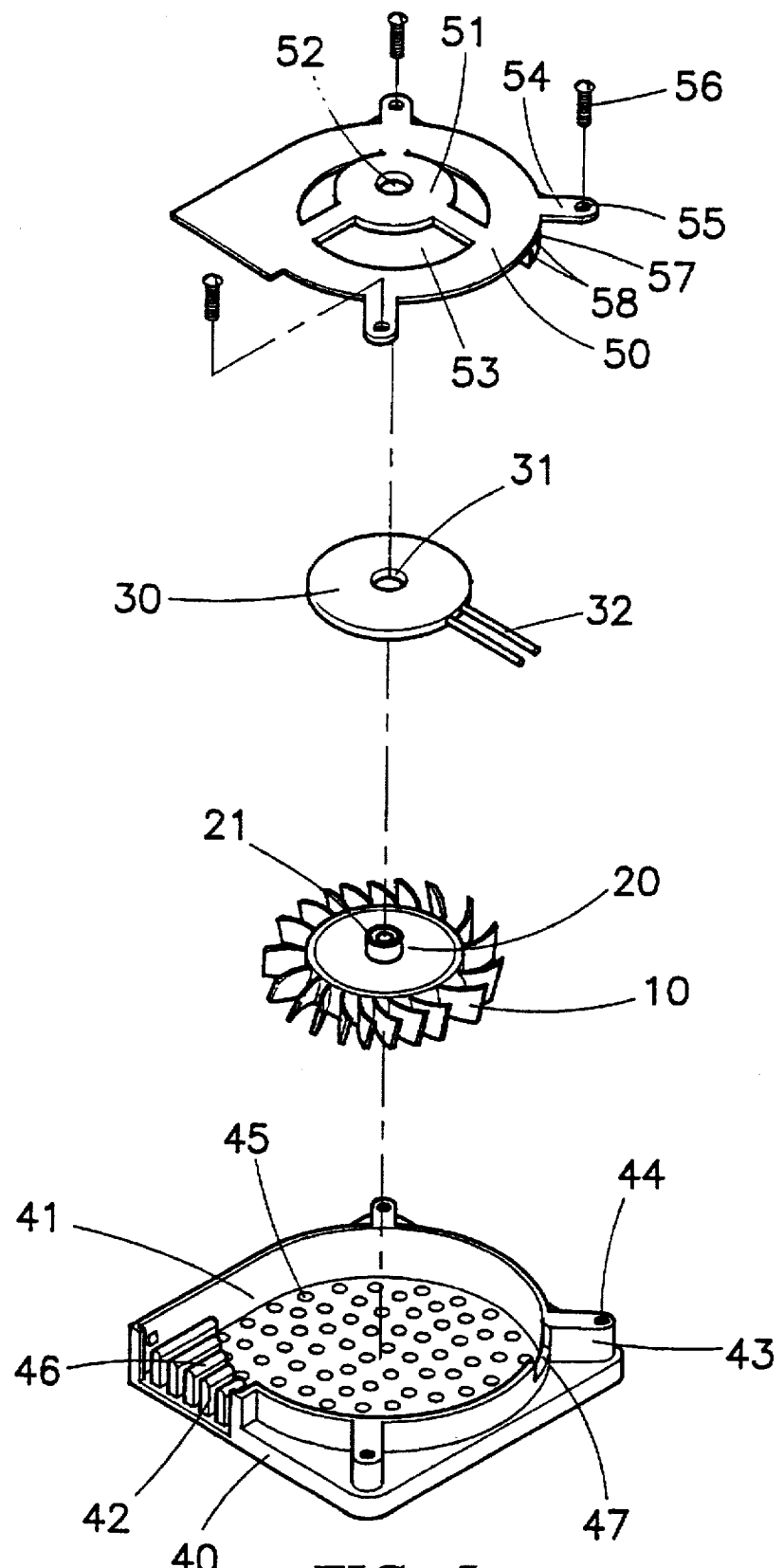
FIG. 5 is an exploded view of an alternate form of the brushless DC fan of the present invention.

FIG. 5 shows an alternate form of the present invention, in which the casing 40 has a plurality of radiating fins 46 raised from the bottom inside the top open chamber 41 for quick dissipation of heat.

It is to be understood that the drawings are designed for purposes of illustration only, and are not intended as a definition of the limits and scope of the invention disclosed.

What the invention claimed is:

1. A brushless DC fan of the type comprising a casing, a cover covered on said casing, a winding assembly disposed inside said casing, a circuit board disposed inside said casing and having electric lead wires extending out of said casing adapted for connection to a power supply, and a fan blade mounted on said winding assembly and controlled by said circuit board to rotate said winding assembly, wherein said cover has a coupling top raised from a top side thereof, and a plurality of air inlets spaced around said coupling top through which air is drawn into said casing; said casing having a top open chamber covered by said cover, and an air outlet in communication with said top open chamber at one side through which air is forced out of said casing; said winding assembly and said circuit board being suspended from the coupling top of said cover inside the top open chamber of said casing; said fan blade being engaged to said winding assembly and suspended in the top chamber of said casing;

wherein the top open chamber of said casing has a plurality of recessed holes in a bottom wall thereof.

2. The brushless DC fan of claim 1 wherein the top open chamber of said casing has a plurality of radiating fins raised from a bottom wall thereof.

3. The brushless DC fan of claim 1 wherein the lead wires of said circuit board are made from rigid electric conductors.

* * * * *